(12) United States Patent
Aoki et al.

(10) Patent No.: US 10,114,483 B2
(45) Date of Patent: Oct. 30, 2018

(54) POSITION INDICATOR

(71) Applicant: Wacom Co., Ltd., Saitama (JP)

(72) Inventors: Shinya Aoki, Saitama (JP); Takenori Kaneda, Tochigi (JP); Yasuhiro Baba, Ibaraki (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 15/387,343

(22) Filed: Dec. 21, 2016

(65) Prior Publication Data

US 2017/0102792 A1 Apr. 13, 2017

Related U.S. Application Data

(63) Continuation of application No. PCT/JP2014/068117, filed on Jul. 8, 2014.

(51) Int. Cl.
*G06F 3/0354* (2013.01)
*G06F 3/038* (2013.01)
*G06F 3/044* (2006.01)

(52) U.S. Cl.
CPC ........ *G06F 3/03545* (2013.01); *G06F 3/0383* (2013.01); *G06F 3/044* (2013.01)

(58) Field of Classification Search
None
See application file for complete search history.

(56) References Cited

U.S. PATENT DOCUMENTS

2014/0327657 A1* 11/2014 Huang ................ G06F 3/03545
345/179

FOREIGN PATENT DOCUMENTS

| CN | 203276192 U | 11/2013 |
| JP | 2006301980 A | * 11/2006 |
| JP | 2011-243081 A | 12/2011 |

OTHER PUBLICATIONS

Partial Supplementary European Search Report and Provisional Opinion, dated Jan. 25, 2018, for European Application No. 14897238.3-1216 / 3168716, 18 pages.

* cited by examiner

*Primary Examiner* — Kenneth B Lee, Jr.
(74) *Attorney, Agent, or Firm* — Seed IP Law Group LLP

(57) ABSTRACT

Various embodiments provide a position indicator including a retaining mechanism that can fix a core body securely and which can electrically transmit a signal from an internal circuit to the core body reliably. The position indicator includes a core body having conductivity, a conductive elastic member including a holding portion for holding and fixing the core body, a core body holder having conductivity and fitted with the conductive elastic member to retain the core body fitted in the conductive elastic member, a signal transmitter, and an electric connecting member for establishing an electric connection between the core body holder and the signal transmitter. The core body is detachably fitted into the conductive elastic member. A signal from the signal transmitter is transmitted from the core body through the electric connecting member, the core body holder, and the conductive elastic member.

22 Claims, 7 Drawing Sheets

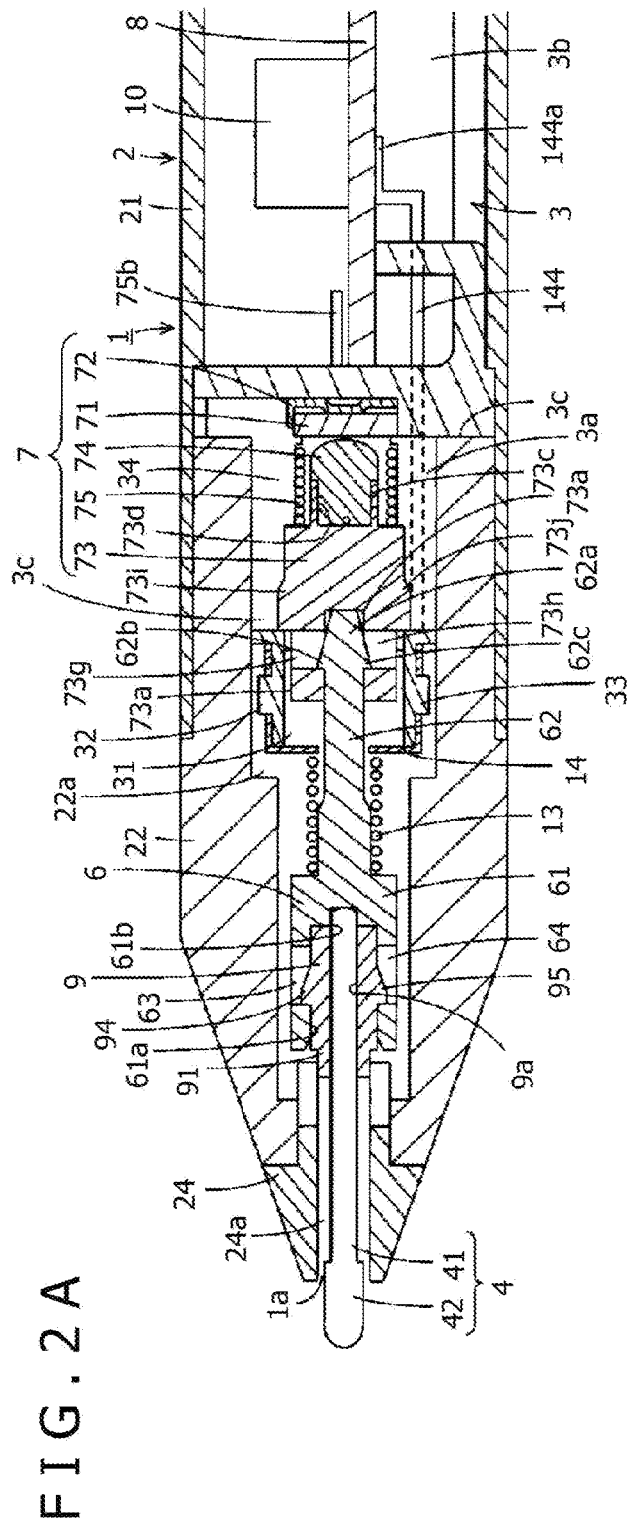
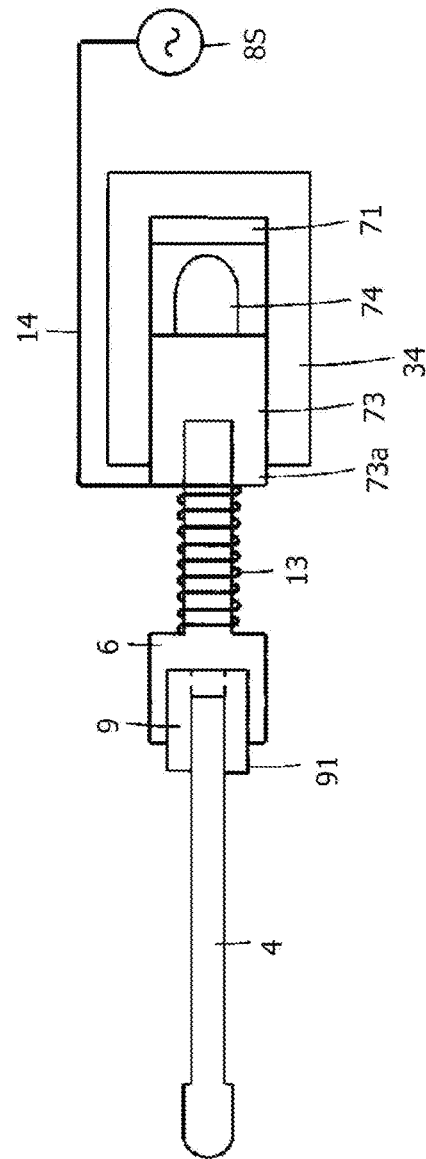
FIG. 2A
FIG. 2B

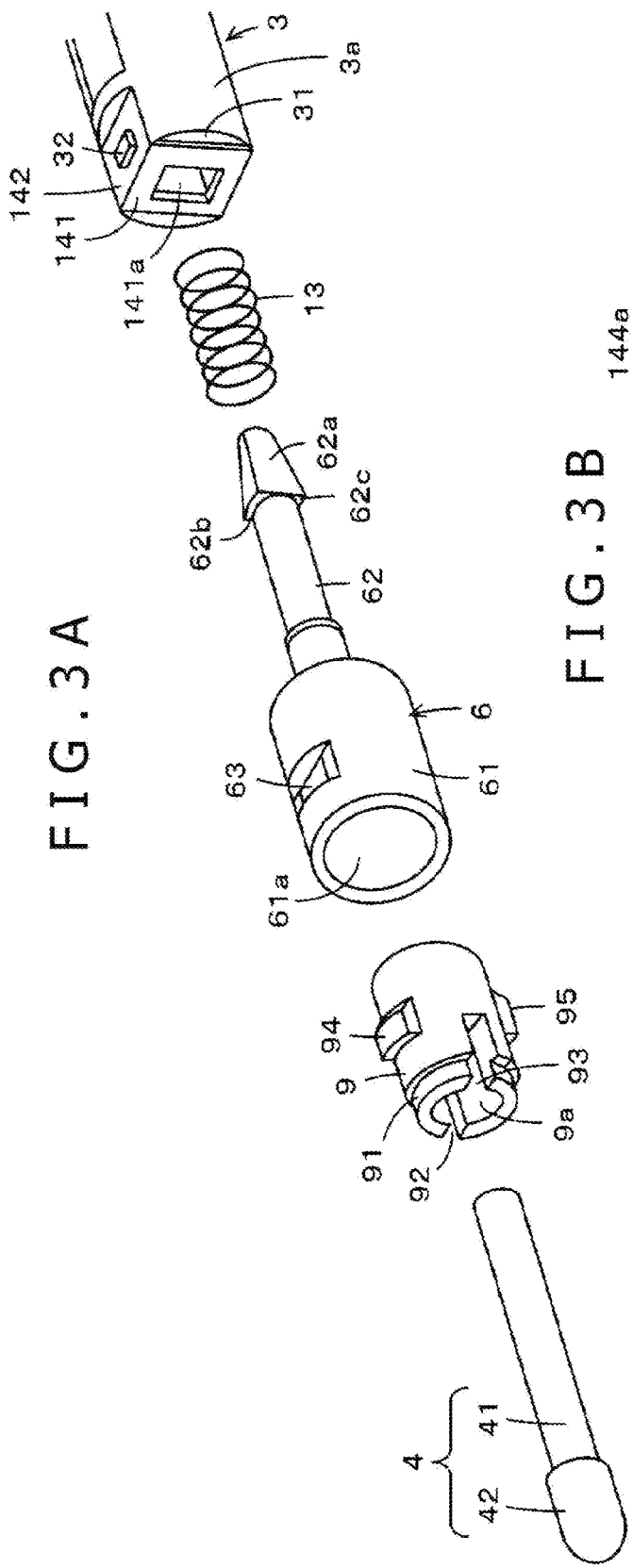

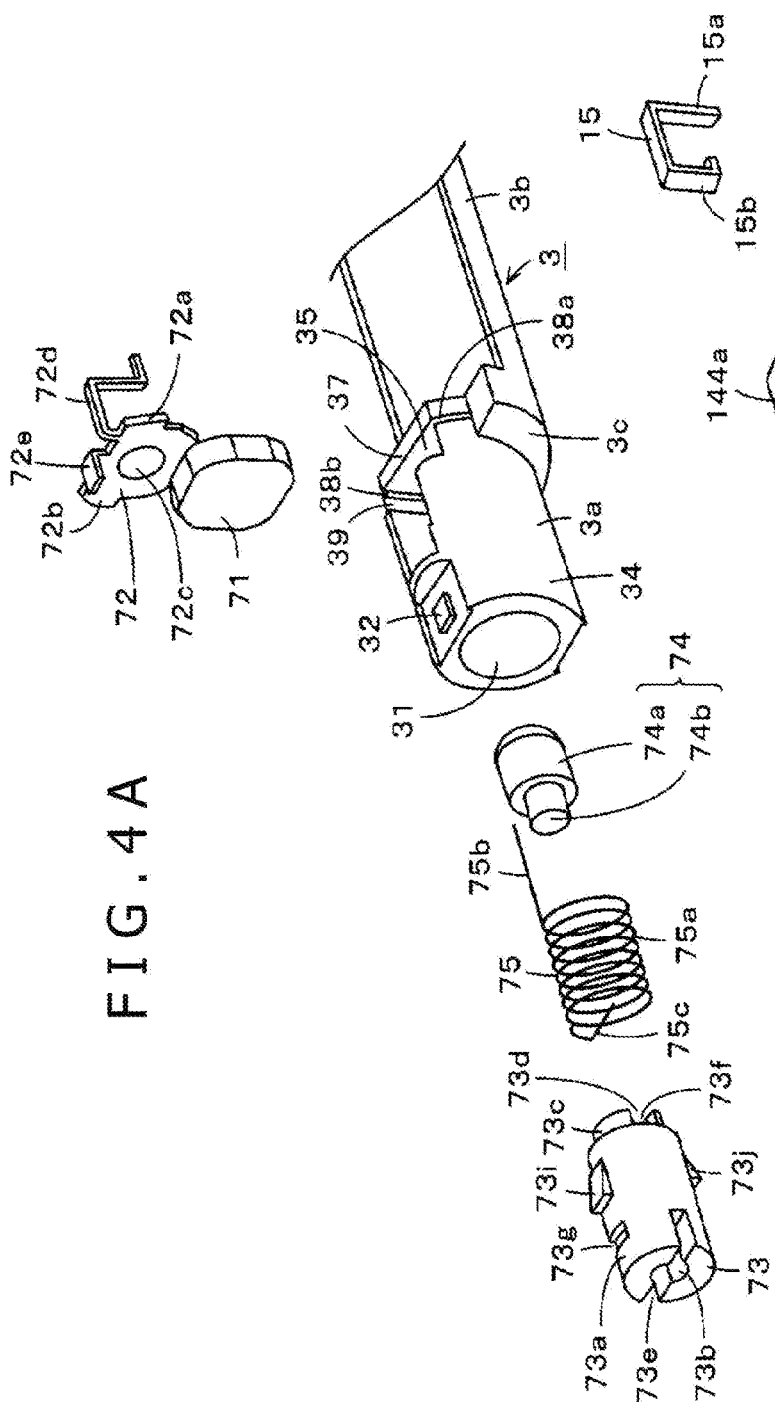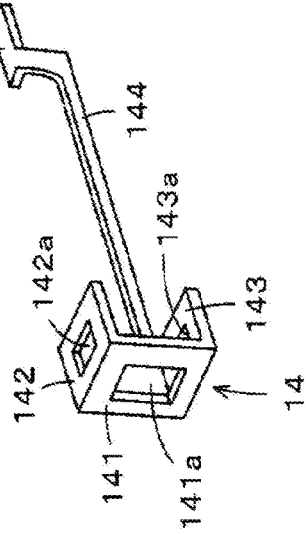

FIG.6
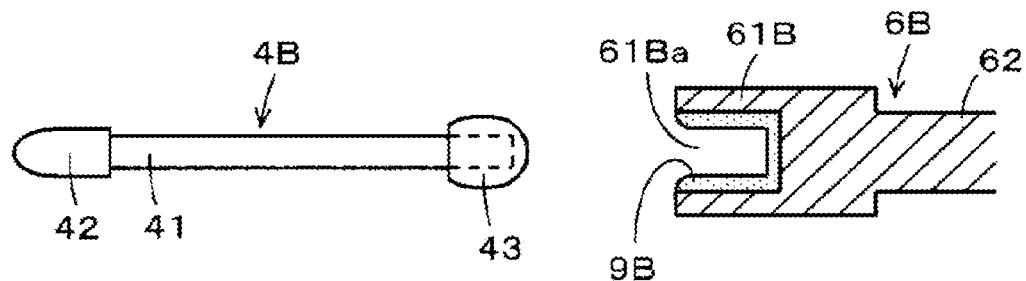
FIG.7A   FIG.7B
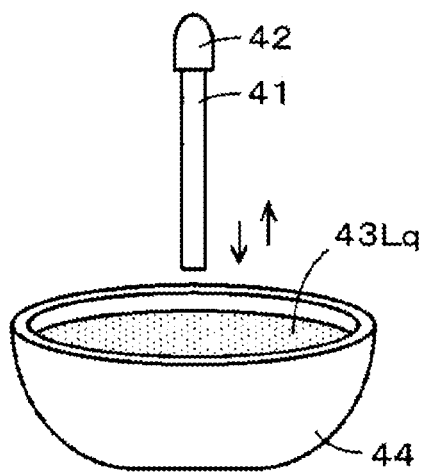 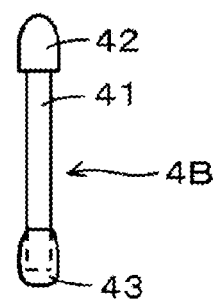
FIG.8
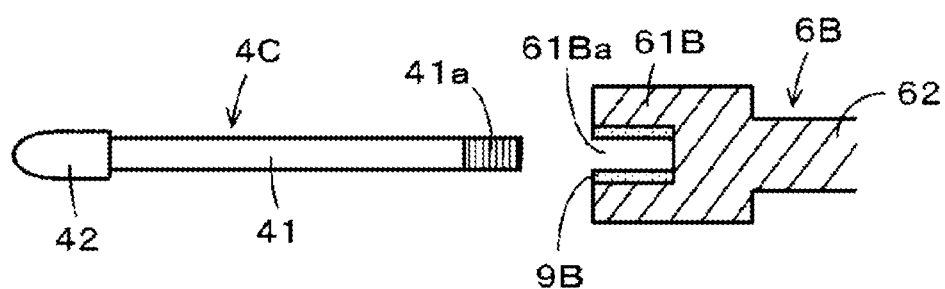

POSITION INDICATOR

BACKGROUND

Technical Field

The present invention relates to a capacitive type position indicator used in conjunction with a position detecting device and having a pen pressure detecting function.

Description of the Related Art

A capacitive type position detecting device (touch panel), which enables input operation by a finger, is used as an input device of a portable terminal, such as a tablet type personal computer (PC) or a mobile telephone terminal (see, for example, Patent Document 1 (Japanese Patent Laid-Open No. 2011-243081)). However, the use of not only fingers but also position indicators configured in a pen form as indicators has recently been increasing.

Conventionally, a type of position indicator referred to as a passive capacitive pen is mainly used for a capacitive type position detecting device of this kind. The passive capacitive pen has a conductive rubber or the like attached to a tip end portion (pen tip) of a core body, and static electricity is made to flow to a human body through the conductive rubber and a conductive casing of the pen type position indicator. The passive capacitive pen thus enables touch input as a substitute for a finger.

However, the conventional position indicator referred to as the conventional passive capacitive pen adopts a system of absorbing static electricity, and therefore requires a certain area of contact with the touch panel. In particular, the conventional passive capacitive pen requires the area of contact between the conductive rubber and the touch panel to be a size approximately equal to an area of contact between the touch panel and a finger. Therefore, with the conventional passive capacitive pen, fine operating input on the touch panel is difficult, even though the passive capacitive pen is a pen type position indicator.

Accordingly, a pen type position indicator (active capacitive pen) has appeared recently which adopts a system in which a signal is sent out from the position indicator side and the signal is detected on the touch panel side, rather than the system of absorbing static electricity. The active capacitive pen has an advantage in that the touch panel can detect a position indicated by the position indicator even when the pen tip is finer because the signal is sent out from the pen tip.

As the pen tip, which is a tip end portion of a core body of the position indicator, becomes finer, a writing feeling as in a case of paper and a pencil is desired as an additional functional element of the position indicator. In order to vary the writing feeling, a material of the pen tip of the core body of the position indicator may be changed. For example, a pen tip made of a metal, a pen tip made of a resin, a pen tip in the form of a felt, and the like have been proposed. In the case of a pen tip made of a resin, in particular, various resin materials can be employed as the resin itself, and the writing feeling can be changed according to each material. The writing feeling of the active capacitive pen can then be changed easily by replacing the core body with core bodies having pen tips made of these different materials.

PRIOR ART DOCUMENT

Patent Document

Patent Document 1: Japanese Patent Laid-Open No. 2011-243081

BRIEF SUMMARY

Technical Problems

Unfortunately, in the case where core bodies having pen tips of various materials are used for the position indicator as described above, it may be difficult to produce core bodies having an accurate diameter due to differences between the materials as raw materials. In addition, when a usage environment, differences in hardness between the raw materials, and the like are taken into consideration, there may be a case where not all of the core bodies can be made to have the same diameter and the core bodies need to have slightly different diameters.

Furthermore, in the active capacitive pen, it is necessary to take out a signal from an internal circuit within the active capacitive pen and transmit the signal to the core body. Thus, secure electric contact of a part holding the replaceable core body is also important.

In a conventional active capacitive pen, as a constitution for securely holding a core body, a metallic washer or the like is used to fix a metallic core body to a holder. However, when the core body is fixed by the metallic washer, a slight variation in diameter of the core body is not tolerated, and a bundle of fiber, such as a felt, core may be caught.

In view of the above points, various embodiments of the present invention provides a position indicator including a retaining mechanism that fixes a core body securely and electrically transmits a signal from an internal circuit to the core body reliably.

Technical Solution

In order to solve the above problems, various embodiments of the present invention provide a position indicator including: a conductive core body; a conductive elastic member including a holding portion for holding and fixing the conductive core body, the conductive core body being detachably fitted into the conductive elastic member; a conductive core body holder fitted with the conductive elastic member to retain the conductive core body fitted in the conductive elastic member; a signal transmitter; and an electric connecting member that electrically couples the core body holder and the signal transmitter to each other, the signal transmitter being configured to transmit a signal to the core body through the electric connecting member, the core body holder, and the conductive elastic member.

In the position indicator according to the invention having the above-described constitution, the core body having conductivity is retained by the core body holder by being fitted in the conductive elastic member fitted in the core body holder having conductivity. The signal from the signal transmitter is supplied to the conductive core body through the conductive core body holder and the conductive elastic member, and is transmitted to the outside from the core body.

According to the position indicator in accordance with the present invention, the core body is fitted into the conductive elastic member including the holding portion for holding and fixing the core body. Thus, even when the diameter of the core body varies, the variation in the diameter is accommodated by the elastic force of the conductive elastic member, and the core body is held and fixed by the holding portion. Therefore the core body is securely fitted to the conductive elastic member. In addition, even when the core body is formed of a felt, for example, a good fitted state can be achieved without the bundle of fiber being caught in a metallic washer.

In addition, because the core body is detachably fitted into the conductive elastic member, the core body can be replaced easily. Further, because of the configuration of a retaining mechanism in which the conductive core body is fitted into the conductive elastic member and the conductive elastic member fitted with the core body is fitted into the conductive core body holder, and because of the configuration in which the electric connecting member establishes an electric connection between the core body holder and the signal transmitter, an electric connection from an internal circuit including a signal generating circuit to the core body is established such that a signal from the internal circuit is reliably transmitted to the core body and sent out from the core body to the outside.

Advantageous Effect

According to the present invention, the conductive core body is fitted into the conductive elastic member, and the conductive elastic member fitted with the core body is fitted into the conductive core body holder. It is therefore possible to provide a position indicator in which the core body can be fixed even when the core body varies in diameter, and which can electrically transmit a signal from the internal circuit to the core body reliably via the core body holder and the conductive elastic member.

BRIEF DESCRIPTION OF THE SEVERAL VIEWS OF THE DRAWINGS

FIG. 2A is an enlarged cross-sectional view of parts of the example of constitution of the embodiment of the position indicator according to the present invention.

FIG. 2B is a diagram of parts extracted from the embodiment of the position indicator according to the present invention.

FIG. 3A is an exploded perspective view of an example of constitution of parts of the embodiment of the position indicator according to the present invention.

FIG. 3B is a perspective view of an example of a conductor terminal member of the embodiment of the position indicator according to the present invention.

FIG. 4A is an exploded perspective view of an example of constitution of parts of the embodiment of the position indicator according to the present invention.

FIG. 4B is a perspective view of an example of a conductor terminal member of the embodiment of the position indicator according to the present invention.

FIG. 4C is a perspective view of an example of a conductor piece of the embodiment of the position indicator according to the present invention.

FIG. 6 is a diagram of another example of constitution of parts of the embodiment of the position indicator according to the present invention.

FIGS. 7A to 7B are diagrams of a method of manufacturing a core body of

FIG. 6 according to the present invention.

FIG. 8 is a diagram of another example of constitution of parts of the embodiment of the position indicator according to the present invention.

DETAILED DESCRIPTION

An embodiment of a position indicator according to the present invention is described with reference to the drawings. FIGS. 1 to 4 are diagrams of an example of constitution of a position indicator 1 according to an embodiment of the present invention. The position indicator 1 is used in conjunction with an electronic apparatus including a capacitive type position detecting device (touch panel). For simplicity of description, the electronic apparatus including the position detecting device (touch panel) is not shown in the figures herein.

Figure 1:
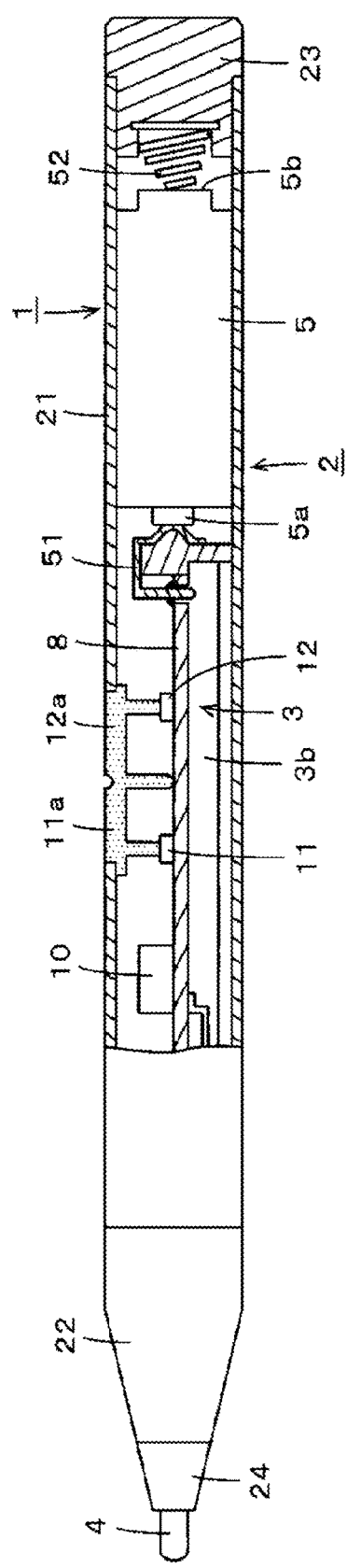
FIG. 1 is a diagram of an example of constitution of an embodiment of a position indicator according to the present invention.

FIG. 1 shows the position indicator 1 according to the present embodiment. FIG. 1 also shows the inside of a portion of a case 2 (casing) of the position indicator 1. FIGS. 2A and 2B are diagrams of an internal constitution of a part on a pen tip side in the position indicator 1, which is not sectioned in FIG. 1. FIG. 2A is an enlarged sectional view of parts of the position indicator 1 according to the present embodiment. FIG. 2B is a diagram of parts extracted from the position indicator 1 according to the present embodiment in consideration of a broader concept.

As shown in FIG. 1, the position indicator 1 has the case 2 constituting a casing having a cylindrical shape elongate in an axial direction, one side in the axial direction of the casing being a pen tip side and having an opening, and another side in the axial direction of the casing being closed.

The case 2 is formed of a conductive material, such as anodized aluminum. The case 2 includes a cylindrical case main body 21 internally having a hollow portion, and includes a front cap 22 and a rear cap 23 coupled to the case main body 21. The case 2 is formed by press-fitting the front cap 22 and the rear cap 23 to the case main body 21.

As shown in FIG. 1 and FIG. 2A, the front cap 22 includes a tubular body having a through hole 22a in the axial direction, and a tapered external shape such that a part of the front cap 22 on a pen tip side of the position indicator 1 decreases in outside diameter toward the pen tip. A pen tip guarding member 24 is provided and fitted to an end portion on the pen tip side of the front cap 22. The pen tip guarding member 24 is formed of an insulative material, such as an acrylonitrile butadiene styrene (ABS) resin. The pen tip guarding member 24 has a through hole 24a in the axial direction, and has a tapered shape continuous with the tapered shape of the front cap 22. An opening on the pen tip side of the through hole 24a of the pen tip guarding member 24 forms an opening portion 1a into which a core body 4 of the position indicator 1 is inserted.

The core body 4 is formed of a conductive material, or a resin mixed with a metal powder. The core body 4 includes a core body main body portion 41 and a tip end portion 42 formed integrally with each other. The core body main body portion 41 constitutes a shaft portion. The tip end portion 42 has a diameter larger than a diameter of the core body main body portion 41. As shown in FIG. 2A, the core body 4 is inserted from the opening portion 1a into the through hole 24a of the pen tip guarding member 24. A maximum outside diameter of the tip end portion 42 of the core body 4 is selected to be smaller than the inside diameter of the through hole 24a of the pen tip guarding member 24. Accordingly, the core body 4 is freely movable in the axial direction within the through hole 24a of the pen tip guarding member 24.

As shown in FIG. 1 and FIG. 2A, a board holder 3, a battery 5, and a core body holder 6 are housed within the hollow portion of the case 2.

The board holder 3 is formed of an insulative resin, or, for example, a liquid crystal polymer. The board holder 3 includes a pressure sensing part retaining portion 3a and a printed board mounting base portion 3b that are continuous with each other in a longitudinal direction, which is the axial direction of the position indicator 1, when housed within the hollow portion of the case 2. The pressure sensing part retaining portion 3a is formed in a cylindrical shape having a hollow portion housing pressure sensing parts 7 (i.e., plurality of parts for pen pressure detection) as an internal hollow portion of the pressure sensing part retaining portion 3a. The printed board mounting base portion 3b has a boat-like shape mounted with and retaining a printed board 8. The boat-like shape being such as is obtained by, for example, cutting a tubular body into substantially halves in the axial direction.

The board holder 3 is housed within the case 2 such that the pressure sensing part retaining portion 3a is on the core body 4 side. The core body holder 6 holding the core body 4 is coupled to the pressure sensing part retaining portion 3a such that a pressure (pen pressure) applied to the core body 4 is transmitted to the pressure sensing parts 7 in the pressure sensing part retaining portion 3a.

The outside diameter of the pressure sensing part retaining portion 3a of the board holder 3 is smaller than the inside diameter of the through hole 22a of the front cap 22. The pressure sensing part retaining portion 3a is thereby housed within the through hole 22a of the front cap 22. In addition, the outside diameter of the printed board mounting base portion 3b of the board holder 3 is larger than the outside diameter of the pressure sensing part retaining portion 3a and smaller than the inside diameter of the case main body 21. The printed board mounting base portion 3b is thus housed in the part of the case main body 21.

Due to a difference in outside diameter between the printed board mounting base portion 3b and the pressure sensing part retaining portion 3a, a step portion 3c is formed on a coupling portion of the board holder 3. The coupling portion couples the printed board mounting base portion 3b and the pressure sensing part retaining portion 3a to each other. As shown in FIG. 2A, the step portion 3c of the board holder 3 abuts against an end surface of the front cap 22. The position of the board holder 3 is thereby regulated to not move to the core body 4 side in the axial direction within the case 2.

A terminal conductor 51 is provided at an end portion of the printed board mounting base portion 3b of the board holder 3. The terminal conductor 51 is positioned on an opposite side of the printed board mounting base portion 3b from the pressure sensing part retaining portion 3a. As shown in FIG. 1, the terminal conductor 51 is electrically coupled to and abuts against a positive side terminal 5a of the battery 5, and is electrically coupled to a copper foil pattern of a power supply line of the printed board 8. In addition, a press-fitted portion of the rear cap 23, which is press-fitted to the case main body 21, is provided with a coil spring terminal 52 made of a conductive metal. The coil spring terminal 52 is electrically coupled to a negative side terminal 5b of the battery 5.

As shown in FIG. 1, the battery 5 is inserted into the case 2 such that the positive side terminal 5a is connected to the terminal conductor 51. The rear cap 23 is thereafter press-fitted into the case main body 21 so as to press the negative side terminal 5b of the battery 5 by the coil spring terminal 52.

In the present embodiment, the case main body 21, which is formed of a conductive material, is electrically coupled to a grounding conductor on the printed board 8, as will be described later. Because the rear cap 23 and the case main body 21 are formed of a conductive material, the negative side terminal 5b of the battery 5 is electrically coupled to the grounding conductor on the printed board 8 via the rear cap 23 and the case main body 21. The positive side terminal 5a of the battery 5 is electrically coupled to the copper foil pattern of the power supply line of the printed board 8 through the terminal conductor 51. The voltage of the battery 5 is thereby supplied as a power supply voltage for a circuit formed on the printed board 8.

In the present embodiment, a circuit section is provided on the printed board 8. The circuit section includes a signal generating circuit that generates a signal to be sent out from the core body 4 of the position indicator 1, an integrated circuit (IC) 10 constituting a control circuit controlling the transmission of the signal from the signal generating circuit to the core body 4, and peripheral circuit parts thereof. The peripheral circuit section includes push switches (side switches) 11 and 12 that are turned on when depressed and return to an off state when the depression is stopped. An opening portion made in the side surface of the case main body 21 is provided with pressing portions 11a and 12a made of an insulative resin having elasticity, such as an ABS resin. The push switches 11 and 12 are turned on and off by an operation of pressing the pressing portions 11a and 12a.

The on-off states of the push switches 11 and 12 are associated with the on-off states of predetermined functions of the electronic apparatus including the position detecting device. The IC 10 is configured to include information indicating the on-off states of the push switches 11 and 12 in the signal to be sent out to the position detecting device, and send out the signal through the core body 4.

In the present embodiment, the core body main body portion 41 of the core body 4 is fitted into the core body holder 6 via a conductive elastic member 9. The core body 4 is thereby coupled to and retained by the core body holder 6. In one embodiment, the core body holder is made of a conductive material. The core body holder 6 is fitted into a retaining member 73 of the pressure sensing parts 7 within the pressure sensing part retaining portion 3a of the board holder 3. A pressure (pen pressure) applied to the core body 4 is thereby transmitted to the pressure sensing parts 7. In this embodiment, the core body holder 6 is biased to the core body 4 side with respect to the board holder 3 by a coil spring 13 provided between the core body holder 6 and the board holder 3. The coil spring 13 is an example of an elastic member formed of a conductive material such as a conductive metal. In conjunction with a conductor terminal member 14 to be described later, the coil spring 13 constitutes an electric connecting member for transmitting a signal from the IC 10 disposed on the printed board 8 to the core body 4.

FIG. 3A is an exploded perspective view of the core body 4, the conductive elastic member 9, the core body holder 6, the coil spring 13, and the pressure sensing part retaining portion 3a of the board holder 3.

The conductive elastic member 9 is formed of, for example, a conductive rubber. The conductive elastic member 9 is formed in a cylindrical shape having a hole portion into which the core body main body portion 41 of the core body 4 is fitted. In the present embodiment, as an example of the hole portion, a through hole 9a having a diameter substantially equal to or slightly smaller than the diameter of the core body main body portion 41 of the core body 4 is formed in the conductive elastic member 9. A holding portion 91 having an outside diameter smaller than the other part of the conductive elastic member 9 and made to be a thin-wall portion is formed on the core body 4 side of the conductive elastic member 9.

Slit portions 92 and 93 are formed in the conductive elastic member 9. The slit portions 92 and 93 extend from an end surface on the core body 4 side of the conductive elastic member 9 in a direction of a central axis of the cylinder of the conductive elastic member 9 along the direction of the central axis of the cylinder. The slit portions 92 and 93 are positioned to be opposed to each other with the position of the central axis of the cylinder of the conductive elastic member 9 interposed between the slit portions 92 and 93. The length of the slit portions 92 and 93 in the direction of the central axis of the cylinder extends beyond at least the part of the holding portion 91 and to the part of large outside diameter of the conductive elastic member 9. On the peripheral side surface of the conductive elastic member 9, locking projecting portions 94 and 95 are positioned to be opposed to each other with the position of the central axis of the cylinder interposed between the locking projecting portions 94 and 95.

With such a constitution, along with the fact that the holding portion 91 is divided into two arc-shaped parts due to the presence of the slit portions 92 and 93 and is a thin-wall portion in the present embodiment, the core body main body portion 41 of the core body 4 can easily displace the holding portion 91 outward elastically when the core body main body portion 41 is inserted and fitted into the conductive elastic member 9. Thus, the core body main body portion 41 of the core body 4 is easily inserted and fitted into the conductive elastic member 9. In a state in which the core body main body portion 41 of the core body 4 is passed through and fitted in the through hole 9a of the conductive elastic member 9, the core body main body portion 41 of the core body 4 is held securely by the elastic restoring force of the holding portion 91. However, the core body 4 can be extracted from the conductive elastic member 9 by pulling the core body 4 with a predetermined force.

The holding portion 91 does not need to be a thin-wall portion as shown in FIG. 2B. However, when the holding portion 91 is a thin-wall portion as in the present embodiment, there is an advantage in that the holding portion 91 is easily displaced elastically in a radial direction from the position of the central axis of the cylinder.

The locking projecting portions 94 and 95 are positioned to be opposed to each other with the position of the central axis of the cylinder interposed between the locking projecting portions 94 and 95, and on the peripheral side surface of the part of large outside diameter of the conductive elastic member 9 other than the holding portion 91.

In one embodiment, the core body holder 6 is made of a conductive material, such as steel special use stainless (SUS). The core body holder 6 includes a housing fitting portion 61 and a rod-shaped portion 62 formed integrally with each other. The housing fitting portion 61 includes a recessed hole 61a that is configured to house and fit with the conductive elastic member 9. The rod-shaped portion 62 is configured to fit into the retaining member 73 of the pressure sensing parts 7. The depth in the axial direction of the recessed hole 61a of the housing fitting portion 61 is approximately equal to the length in the axial direction of the large-diameter part of the conductive elastic member 9 other than the holding portion 91.

In the side surface of the housing fitting portion 61 of the core body holder 6, opening portions 63 and 64 are formed in positions corresponding to the locking projecting portions 94 and 95 of the conductive elastic member 9 when the conductive elastic member 9 is housed within the recessed hole 61a. Accordingly, as shown in FIG. 2A, when the conductive elastic member 9 is pushed into the housing fitting portion 61 of the core body holder 6, the locking projecting portions 94 and 95 of the conductive elastic member 9 are positioned in the opening portions 63 and 64 of the housing fitting portion 61, and step portions of the locking projecting portions 94 and 95 abut against walls of the opening portions 63 and 64. The conductive elastic member 9 thereby does not move in the axial direction with respect to the housing fitting portion 61 of the core body holder 6. That is, the conductive elastic member 9 is locked within the housing fitting portion 61 of the core body holder 6. In addition, in the present embodiment, a recessed hole 61b housing a part of the core body main body portion 41 of the core body 4 which part penetrates through and projects from the through hole 9a of the conductive elastic member 9 is formed in a bottom portion of the recessed hole 61a of the housing fitting portion 61 of the core body holder 6.

Accordingly, when the conductive elastic member 9 is housed and locked within the housing fitting portion 61 of the core body holder 6, the holding portion 91 of the conductive elastic member 9 is in a state of projecting outward without being housed within the housing fitting portion 61 of the core body holder 6 because dimensions in the axial direction of the conductive elastic member 9 and the recessed hole 61a of the housing fitting portion 61 of the core body holder 6 are selected as described above. Hence, when the core body main body portion 41 of the core body 4 is press-fitted into the through hole 9a of the conductive elastic member 9 housed within the housing fitting portion 61 of the core body holder 6, the holding portion 91 can be elastically displaced as described above. Thus, the core body main body portion 41 of the core body 4 can be press-fitted into the holding portion 91 easily, and the holding portion 91 holds the press-fitted core body main body portion 41 securely.

After the conductive coil spring 13 is fitted to the rod-shaped portion 62 of the core body holder 6 housing the conductive elastic member 9 as described above, the rod-shaped portion 62 of the core body holder 6 is fitted into the retaining member 73 of the pressure sensing parts 7 within the pressure sensing part retaining portion 3a of the board holder 3.

For the position indicator 1 according to the present embodiment, a transmission signal generated by the circuit formed on the printed board 8 is supplied to the core body 4. However, because the board holder 3 and the retaining member 73 of the pressure sensing parts 7 housed within the pressure sensing part retaining portion 3a are made of a resin as an insulative material, an electric connection is not established between the core body holder 6 and the retaining member 73.

Therefore, an electric connection for the supply of the signal from the circuit on the printed board 8 to the core body 4 is not established automatically. In the present embodiment, an electric connecting member is formed by the coil spring 13 made of a conductive material, and a conductor terminal member 14 provided to the pressure sensing part retaining portion 3a of the board holder 3. The coil spring 13 is disposed between the core body holder 6 and the pressure sensing part retaining portion 3a of the board holder 3. This electric connecting member realizes an electric connection for the supply of the signal from a signal transmitting circuit 8S (a signal transmitter) on the printed board 8 (see FIG. 2B).

That is, in the present embodiment, as shown in FIG. 3A, the conductor terminal member 14 made of a material having conductivity and elasticity, such as SUS, is mounted on the pressure sensing part retaining portion 3a of the board holder 3 so as to cover the opening portion of a recessed hole 31 into which the rod-shaped portion 62 of the core body holder 6 is inserted.

As shown in FIGS. 3A and 3B, the conductor terminal member 14 includes an abutting plate portion 141 that covers the recessed hole 31 of the pressure sensing part retaining portion 3a of the board holder 3 and which has a through hole 141a into which the rod-shaped portion 62 of the core body holder 6 is inserted, and attaching plate portions 142 and 143 orthogonal to the abutting plate portion 141 and opposed to each other. In one embodiment, the abutting plate portion 141 and the attaching plate portions 142 and 143 are formed by bending one elongate flat plate of SUS.

The attaching plate portions 142 and 143 include through holes 142a and 143a, respectively. In addition, as shown in FIG. 3B, the attaching plate portion 143 includes an extending portion 144 that is integral with the attaching plate portion 143, straddles the part of the pressure sensing part retaining portion 3a of the board holder 3, and extends to the part of the printed board mounting base portion 3b. Formed at an end portion of the extending portion 144 is a terminal portion 144a, which is, for example, soldered to the undersurface of the printed board 8.

An upper side surface and a lower side surface sandwiching the recessed hole 31 of the pressure sensing part retaining portion 3a of the board holder 3 are flat surfaces, and the projecting portions 32 and 33 are formed on the respective flat surfaces. In one embodiment, a distance between the attaching plate portions 142 and 143 is substantially equal to a distance between the flat surfaces on which the projecting portions 32 and 33 are formed. In addition, the through holes 142a and 143a of the attaching plate portions 142 and 143 are in positions corresponding to the positions of the projecting portions 32 and 33.

The conductor terminal member 14 is elastically fitted to the pressure sensing part retaining portion 3a of the board holder 3 such that the attaching plate portions 142 and 143 sandwich the two flat surfaces on which the projecting portions 32 and 33 of the pressure sensing part retaining portion 3a of the board holder 3 are formed. In this fitting, the projecting portions 32 and 33 are fitted into the through holes 142a and 143a of the attaching plate portions 142 and 143 such that the conductor terminal member 14 is prevented from being detached from the pressure sensing part retaining portion 3a of the board holder 3.

In a state in which the conductor terminal member 14 is fitted to the pressure sensing part retaining portion 3a of the board holder 3, as shown in FIG. 2A, the terminal portion 144a at an end of the extending portion 144 extending from the conductor terminal member 14 abuts against a conductor on the undersurface side of the printed board 8 mounted on the printed board mounting base portion 3b of the board holder 3. In one embodiment, the terminal portion 144a is soldered to the conductor on the undersurface side of the printed board 8. The conductor terminal member 14 and the signal generating circuit formed on the top surface of the printed board 8 are thereby electrically coupled to each other.

As described above, the rod-shaped portion 62 of the core body holder 6 into which the conductive elastic member 9 is fitted is inserted into the recessed hole 31 of the pressure sensing part retaining portion 3a of the board holder 3 through the through hole 141a of the abutting plate portion 141 of the conductor terminal member 14, and is fitted into the pressure sensing part retaining portion 3a, in a state in which the coil spring 13 is interposed therebetween. The inside diameter of the coil spring 13 is set larger than the external shape of the rod-shaped portion 62 of the core body holder 6, and is set larger than the through hole 141a of the abutting plate portion 141 of the conductor terminal member 14 fitted to the pressure sensing part retaining portion 3a.

Accordingly, the coil spring 13 is in elastic contact with the core body holder 6, and abuts against and is in elastic contact with the abutting plate portion 141 of the conductor terminal member 14. The coil spring 13 is made of a conductive material, and the conductive elastic member 9 and the core body holder 6 have conductivity. Thus, the conductive elastic member 9 fitted in the core body holder 6 is electrically coupled to the circuit section on the printed board 8 via the coil spring 13 and the conductor terminal member 14.

The core body main body portion 41 of the core body 4 is inserted and fitted as described above into the through hole 9a of the conductive elastic member 9 fitted in the core body holder 6 housed within the case 2 as described above. The core body 4 is thus retained with respect to the core body holder 6 via the conductive elastic member 9. In this state, the core body 4 is electrically coupled to the signal transmitting circuit 8S of the printed board 8, and a signal from the signal transmitting circuit 8S is supplied to the core body 4.

Incidentally, in the state in which the core body 4 is coupled to the pressure sensing part retaining portion 3a via the core body holder 6, a part of the tip end portion 42 of the core body 4 is projected and exposed to the outside through the opening portion 1a of the case 2.

Description will next be made of constitutions of the pressure sensing part retaining portion 3a of the board holder 3 and the pressure sensing parts 7, as well as the fitting of the core body holder 6 into the retaining member 73 of the pressure sensing parts 7.

FIG. 4A is an exploded perspective view of the pressure sensing parts 7 housed within the pressure sensing part retaining portion 3a of the board holder 3. A pen pressure detecting module, or a pen pressure detector, is formed by housing the pressure sensing parts 7 in the pressure sensing part retaining portion 3a as shown in FIG. 4A. The core body main body portion 41 of the core body 4 is coupled to the pen pressure detecting module via the core body holder 6. A pen pressure applied to the tip end portion 42 of the core body 4 is thereby detected by the pressure sensing parts 7 of the pen pressure detecting module. In this embodiment, a part of the pressure sensing parts 7 constituting the pen pressure detecting module move in the axial direction together with the core body 4 and the core body holder 6 according to the pen pressure applied to the tip end portion 42 of the core body 4. The pen pressure detecting module thereby detects the pen pressure.

In the present embodiment, a part formed by mounting and fixing the printed board 8 on the printed board mounting base portion 3b of the board holder 3, housing the pressure sensing parts 7 in the pressure sensing part retaining portion 3a, and coupling the core body 4 to the board holder 3 via the core body holder 6 can be handled as one module part. The position indicator 1 may then be completed by housing the module part within the hollow portion of the case 2. Incidentally, the core body 4 is detachably coupled to the core body holder 6, as described above. That is, in the position indicator 1 according to the present embodiment, the core body 4 is configured to be replaceable.

The pen pressure detecting module in the present example uses a variable capacitor that changes in capacitance according to the pen pressure applied to the core body 4.

As shown in FIG. 4A, the pressure sensing parts 7 in the present embodiment are constituted of a plurality of parts including a dielectric 71, a terminal member 72, the retaining member 73, a conductive member 74, and an elastic member 75. The terminal member 72 is made of a conductive material, such as SUS. The terminal member 72 includes a first electrode of the variable capacitor formed by the pressure sensing parts 7. In addition, the conductive member 74 is made of a conductive rubber, for example, and the elastic member is formed by a coil spring made of a conductive material, such as SUS. The conductive member 74 and the elastic member 75 are electrically coupled to each other to constitute a second electrode of the variable capacitor.

As shown in FIG. 4A, the pressure sensing part retaining portion 3a of the board holder 3 is formed by a tubular body 34 having a hollow portion, and houses the pressure sensing parts 7 in a state of being arranged in the axial direction within the hollow portion.

Of the pressure sensing parts 7 constituted of the plurality of parts as described above, the dielectric 71 and the terminal member 72, which are parts not moving in the axial direction within the pressure sensing part retaining portion 3a formed by the tubular body 34, are inserted from a direction orthogonal to the axial direction of the tubular body 34 and perpendicular to a board surface 8a of the printed board 8, and through an opening portion 35 formed in a part of the side circumferential surface of the tubular body 34 constituting the pressure sensing part retaining portion 3a and opened in a direction orthogonal to the axial direction. The dielectric 71 and the terminal member 72 are housed as shown in FIG. 1.

The tubular body 34 constituting the pressure sensing part retaining portion 3a has the opening of the recessed hole 31 on the core body 4 side in the axial direction of the tubular body 34, and is closed by a wall portion 37 on the printed board mounting base portion 3b side. Slits 38a and 38b having a predetermined width slightly larger than the thickness of the terminal member 72 in the axial direction are formed in a portion coupling the side circumferential surface of the tubular body 34 to the wall portion 37. The terminal member 72 has projecting portions 72a and 72b to be fitted into the slits 38a and 38b. Hence, because the projecting portions 72a and 72b are fitted into the slits 38a and 38b of the tubular body 34, the terminal member 72 is locked to the tubular body 34 so as not to move in the axial direction.

In addition, the inner wall of the tubular body 34 has a recessed groove 39 formed in a position adjacent to the slits 38a and 38b in the axial direction. The recessed groove 39 have an inside diameter that is larger than the inside diameter of a part in which the opening portion 35 of the tubular body 34 is formed (see FIG. 4A). The dielectric 71 has a plate-shaped body having an external shape to be fitted into the recessed groove 39, and a thickness corresponding to the width in the axial direction of the recessed groove 39. Hence, the dielectric 71 is inserted and fitted into the recessed groove 39 of the tubular body 34 through the opening portion 35, and is thereby prevented from moving in the axial direction within the tubular body 34 in the fitted state.

The terminal member 72 that plays the role of the first electrode of the variable capacitor has a lead portion 72d. The lead portion 72d straddles the wall portion 37 of the tubular body 34 when housed within the pressure sensing part retaining portion 3a. In one embodiment, the lead portion 72d is connected by soldering to a land portion (not shown) on the board surface of the printed board 8 mounted on the printed board mounting base portion 3b.

The terminal member 72 has an L-shaped projection 72e that holds a side surface portion on the opening portion 35 side of the dielectric 71 when the dielectric 71 and the terminal member 72 are housed within the pressure sensing part retaining portion 3a.

In one embodiment, the retaining member 73 is made of a resin as a nonconductive material, or an insulative material. As shown in FIG. 4A, the retaining member 73 includes a cylindrically shaped portion 73a on the core body 4 side of the retaining member 73 in the axial direction, and a ring-shaped projecting portion 73c on an opposite side in the axial direction from the recessed hole 73b side. The cylindrically shaped portion 73a includes a recessed hole 73b into which the rod-shaped portion 62 of the core body holder 6 is press-fitted. The ring-shaped projecting portion 73c is provided with a recessed hole 73d into which the conductive member 74 is fitted.

Slits 73e extending along the axial direction of the recessed hole 73b are formed in the cylindrically shaped portion 73a of the retaining member 73. The slits 73e assist in facilitating the press-fitting of the rod-shaped portion 62 of the core body holder 6 into the recessed hole 73b. That is, by having the slits 73e, the cylindrically shaped portion 73a of the retaining member 73 constitutes a holding portion corresponding to the rod-shaped portion 62 of the core body holder 6, and the retaining member 73 securely holds and retains the core body holder 6. The cylindrically shaped portion 73a of the retaining member 73 constitutes a core body holder retaining portion, and the retaining member 73 constitutes a retaining portion.

The ring-shaped projecting portion 73c of the retaining member 73 includes slits 73f communicating with each other with the recessed hole 73d interposed therebetween. Due to the presence of the slits 73f, the conductive member 74 is securely held by the ring-shaped projecting portion 73c and retained by the retaining member 73.

Opening portions 73g and 73h communicating with the recessed hole 73b are formed in side surface portions of the cylindrically shaped portion 73a of the retaining member 73 in such a manner as to be opposed to each other with the position of the central axis of the cylinder interposed between the opening portions 73g and 73h. In addition, engaging projecting portions 73i and 73j are formed on the peripheral side surface of the cylindrically shaped portion 73a of the retaining member 73.

Step portions 62b and 62c to be engaged with the opening portions 73g and 73h are positioned in the vicinity of a tip portion 62a of the rod-shaped portion 62 of the core body holder 6. When the rod-shaped portion 62 of the core body holder 6 is press-fitted into the recessed hole 73b of the retaining member 73 as shown in FIG. 2A, the step portions 62b and 62c abut against wall portions of the opening portions 73g and 73h, and are thus engaged such that the rod-shaped portion 62 of the core body holder 6 does not fall off to the core body 4 side.

In one embodiment, the conductive member 74 is a conductive and elastically deformable elastic member, and is, for example, made of a silicon conductive rubber or a pressure conductive rubber. The conductive member 74 includes a projecting portion 74a to be fitted into the recessed hole 73d of the ring-shaped projecting portion 73c of the retaining member 73. In addition, in one embodiment, the elastic member 75 is formed by a coil spring having conductivity. The elastic member 75 includes a winding portion 75a having elasticity, a terminal piece 75b provided at one end portion of the winding portion 75a, and a connecting portion 75c provided at another end portion of the winding portion 75a.

The elastic member 75 is combined in the axial direction of the retaining member 73 such that the ring-shaped projecting portion 73c of the retaining member 73 is housed within the winding portion 75a. The projecting portion 74a of the conductive member 74 is fitted into the recessed hole 73d of the ring-shaped projecting portion 73c of the retaining member 73. When the projecting portion 74a is fitted into the recessed hole 73d, the connecting portion 75c of the elastic member 75 is inserted from the slit portions of the ring-shaped projecting portion 73c of the retaining member 73 into a bottom portion of the recessed hole 73d formed in the ring-shaped projecting portion 73c. Hence, when a small-diameter portion 74b of the conductive member 74 is press-fitted into the ring-shaped projecting portion 73c of the retaining member 73, an end surface of the small-diameter portion 74b of the conductive member 74 comes in contact with and becomes electrically coupled to the connecting portion 75c of the conductive elastic member 75.

When the terminal piece 75b of the elastic member 75 is inserted into the tubular body 34, the terminal piece 75b of the elastic member 75 straddles the dielectric 71, the terminal member 72, and the wall portion 37. The terminal piece 75b of the elastic member 75 is connected by soldering to a conductive pattern on the board surface of the printed board 8 mounted on the printed board mounting base portion 3b.

The conductive member 74 coupled to the retaining member 73 in the axial direction via the elastic member 75 (see FIG. 2A) is inserted from the opening side of the recessed hole 31 into the tubular body 34. The engaging projecting portions 73i and 73j formed on the side circumferential surface of the cylindrically shaped portion 73a of the retaining member 73 are then engaged with engaging step portions 34a and 34b (see FIG. 2A) formed on the side circumferential surface of the tubular body 34 constituting the pressure sensing part retaining portion 3a. The retaining member 73 is thereby locked so as not to fall off from the recessed hole 31 of the tubular body 34 to the core body 4 side. However, when a pen pressure is applied from the core body 4 side in the state in which the retaining member 73 is housed within the hollow portion of the tubular body 34, the retaining member 73 can move to the opposite side from the core body 4 in the axial direction within the hollow portion of the tubular body 34. When the application of the pen pressure from the core body 4 side ceases, the elastic biasing force of the elastic member 75 returns the engaging projecting portions 73i and 73j to the state of being engaged with the engaging step portions 34a and 34b.

After the pressure sensing parts 7 are housed within the tubular body 34 constituting the pressure sensing part retaining portion 3a as described above, the above-described conductor terminal member 14 shown in FIG. 4B is elastically mounted on the end surface on the opening side of the recessed hole 31 of the tubular body 34 such that the attaching plate portions 142 and 143 sandwich the two flat surfaces on which the projecting portions 32 and 33 of the tubular body 34 are formed and the projecting portions 32 and 33 are fitted into the through holes 142a and 143a of the attaching plate portions 142 and 143, as described above. Thereafter, as described above, the rod-shaped portion 62 of the core body holder 6 in which the conductive elastic member 9 is fitted is inserted through the through hole 141a of the abutting plate portion 141 of the conductor terminal member 14 into the recessed hole 31 of the tubular body 34, and is fitted into the retaining member 73. The core body holder 6 is thereby retained with respect to the pressure sensing part retaining portion 3a of the board holder 3.

While in the state in which the core body holder 6 is fitted in the pressure sensing part retaining portion 3a of the board holder 3 as described above, the core body main body portion 41 of the core body 4 is press-fitted into the through hole 9a of the conductive elastic member 9 fitted in the core body holder 6. The core body 4 is thereby securely retained by the conductive elastic member 9 with respect to the core body holder 6 as described above.

Accordingly, because the core body 4, the conductive elastic member 9, and the core body holder 6 all have conductivity, the core body 4 and the signal transmitting circuit 8S of the printed board 8 are electrically coupled to each other through the conductive coil spring 13 and the conductor terminal member 14 (see FIG. 2B). Hence, a signal from the signal transmitting circuit 8S on the printed board 8 is sent out from the core body 4.

In present embodiment, the core body 4, the conductive elastic member 9, the core body holder 6, and the coil spring 13 made of conductive materials are sequentially arranged in the axial direction and electrically coupled to each other. However, because the retaining member 73 constituting the pen pressure detecting module is formed of an insulative material, the electric connection in the axial direction is ended at the part of the pen pressure detecting module. In the present embodiment, however, the conductor terminal member 14 is locked to the pen pressure detecting module and bypasses the pen pressure detecting module and ensures the electric connection in the axial direction. Thus, even when the pen pressure detecting module formed of an insulative material is present in the axial direction, the electric connection in the axial direction is realized easily.

As described above, the core body 4 can be extracted in the direction of the tip end portion 42 side from the state in which the core body 4 is press-fitted in the through hole 9a of the conductive elastic member 9 fitted in the core body holder 6 and is thus retained by the core body holder 6. Hence, as described above, the core body 4 is replaceable.

As shown in FIGS. 4A and 4C, the step portion 3c formed on the coupling portion, which couples the printed board mounting base portion 3b and the pressure sensing part retaining portion 3a of the board holder 3 to each other, is provided with a conductor piece 15 that straddles the step portion 3c. One end portion 15a of the conductor piece 15 is connected to the grounding conductor on the printed board 8 on the printed board mounting base portion 3b. Another end portion 15b of the conductor piece 15 is connected to the front cap 22 that abuts against the step portion 3c and is made of a conductive material. The grounding conductor on the printed board 8 is thereby electrically coupled to the front cap 22 and the case main body 21 and the rear cap 23.

In the position indicator 1, when a pressure is applied to the tip end portion 42 of the core body 4, the core body 4 is displaced to the rear cap 23 side in the axial direction according to the pressure. Due to the displacement of the core body 4, the retaining member 73 within the pressure sensing part retaining portion 3a to which the core body main body portion 41 is coupled is displaced to the dielectric 71 side against the elastic biasing force of the elastic member 75. As a result, the conductive member 74 fitted to the retaining member 73 is displaced to the dielectric 71 side such that a distance between the conductive member 74 and the dielectric 71, and further an area of contact between the conductive member 74 and the dielectric 71, change according to the pressure applied to the core body 4.

The capacitance of the variable capacitor formed between the terminal member 72 constituting the first electrode and the conductive member 74 constituting the second electrode thereby changes according to the pressure applied to the core body 4. The change in the capacitance of the variable capacitor is detected by the IC 10 provided on the printed board 8. The pen pressure is thus detected.

The IC 10 of the position indicator 1 sends out, for example, a burst signal for position detection to the position detecting device. During a period during which the burst signal is sent out, the circuit formed on the printed board 8 of the position indicator 1 performs an operation of detecting a pen pressure based on the capacitance of the variable capacitor formed by the pen pressure detecting module described above. After an end of the period of sending out the burst signal, the position indicator 1 sends out an encoded signal corresponding to the detected pen pressure from the core body 4.

The position detecting device receives the signal from the position indicator 1 by, for example, a sensor unit including a plurality of conductors arranged in a first direction (e.g., X-axis direction) and a plurality of conductors arranged in a second direction (e.g., Y-axis direction) orthogonal to the first direction. In this case, the position detecting device detects the position in the X-axis direction of a position indicated by the position indicator 1 by detecting which of the plurality of conductors constituting the sensor unit and arranged in the first direction has received the burst signal from the position indicator 1, and detects the position in the Y-axis direction of the position indicated by the position indicator 1 by detecting which of the plurality of conductors arranged in the second direction has received the burst signal from the position indicator 1. The X-coordinate and Y-coordinate of the position indicated by the position indicator 1 on the sensor unit are thereby detected. The position detecting device detects the pen pressure by decoding the encoded signal corresponding to the pen pressure which encoded signal is sent from the position indicator 1 after the burst signal.

A known circuit configuration is applicable as a circuit configuration of the position detecting device, and therefore detailed description thereof will be omitted in the present specification.

Effect of Embodiment

According to the capacitive type position indicator 1 in accordance with the foregoing embodiment, the core body 4 can be securely retained with respect to the core body holder 6 via the conductive elastic member 9 while the core body 4 is made replaceable, and the signal generating circuit formed on the printed board 8 and the core body 4 can be electrically connected to each other through the core body holder 6, the coil spring 13, and the conductor terminal member 14. Hence, a signal from the signal generating circuit on the printed board 8 can be reliably sent out from the core body 4.

In addition, according to the foregoing embodiment, a simple constitution can be realized by merely arranging in the axial direction and fitting and coupling the board holder 3 having the core body 4, the conductive elastic member 9, the core body holder 6, the coil spring 13, and the conductor terminal member 14 fitted to the pressure sensing part retaining portion 3a, and housing the coupled object within the case 2 of the position indicator 1.

Hence, the position indicator 1 according to the present embodiment has a structure capable of being manufactured by a simple process and suitable for mass production.

Modifications of Principal Parts of Position Indicator

<First Modification>

Figure 5A:
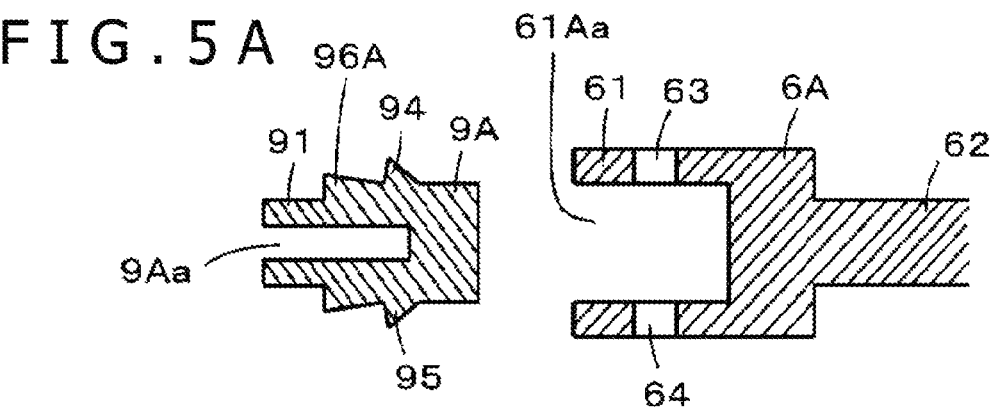
FIGS. 5A to 5C are diagrams of another example of constitution of parts of the embodiment of the position indicator according to the present invention.
Figure 5B:
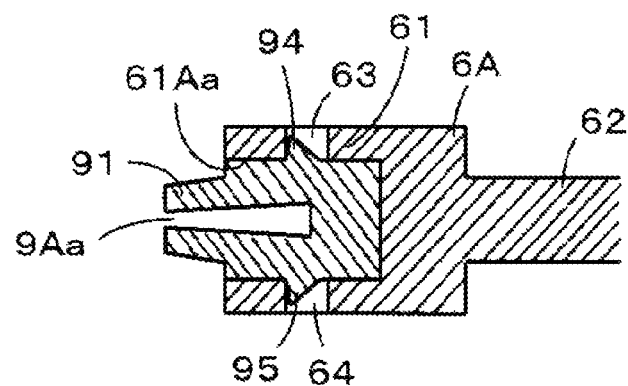
Figure 5C:
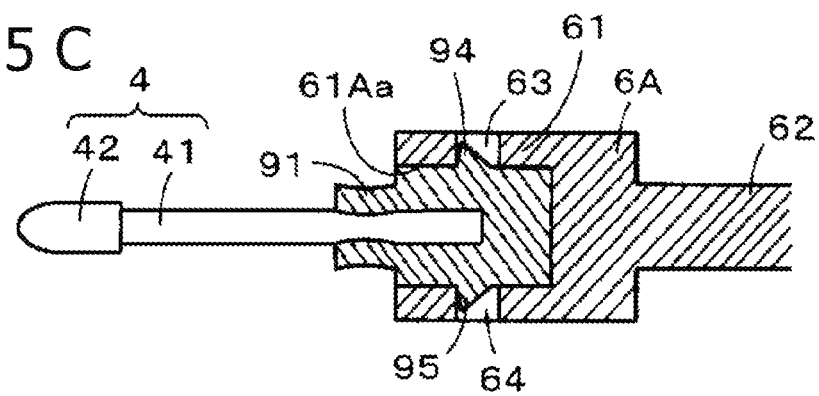

FIGS. 5A to 5C are diagrams of an example of a position indicator having a constitution intended for retaining the core body 4 more securely with respect to the core body holder 6 via the conductive elastic member 9.

In the position indicator according to a present modification, the constitutions of a conductive elastic member formed of a conductive rubber and a core body holder are slightly different from those of the position indicator 1 in the foregoing example. The position indicator according to the present modification is otherwise formed in an exactly similar manner to the position indicator 1 in the foregoing example.

Specifically, as shown in FIG. 5A, as with the conductive elastic member 9 described above, a conductive elastic member 9A of the position indicator according to the present modification has a cylindrical shape, and includes a holding portion 91 and locking projecting portions 94 and 95. However, the conductive elastic member 9A in the present example is formed such that the outside diameter of a cylindrically shaped portion of the conductive elastic member 9A from the position of the locking projecting portions 94 and 95 of the cylindrically shaped portion to the holding portion 91 is gradually increased toward the holding portion 91.

In addition, in the conductive elastic member 9A in the present example, as shown in FIG. 5A, a recessed hole 9Aa is formed as a hole portion in which the core body main body portion 41 of the core body 4 fits in to, rather than a through hole. Accordingly, a recessed hole 61Aa of a housing fitting portion 61 of a core body holder 6A into which the conductive elastic member 9A is fitted does not have a recessed hole into which to insert an end of the core body main body portion 41, such as the recessed hole 61b of the core body holder 6 in the case of the position indicator 1 described above.

With the conductive elastic member 9A as described above is used, when the conductive elastic member 9A is fitted into the recessed hole 61Aa of the housing fitting portion 61 of the core body holder 6 and the locking projecting portions 94 and 95 are engaged with opening portions 63 and 64 of the core body holder 6, as shown in FIG. 5(B), the recessed hole 9Aa of the conductive elastic member 9A is displaced so as to become narrower on the holding portion 91 side because the outside diameter of the cylindrically shaped portion from the position of the locking projecting portions 94 and 95 of the conductive elastic member 9A to the holding portion 91 is gradually increased toward the holding portion 91.

The holding portion 91 is a thin-wall portion as described above, and has slits 92 and 93 (not shown in FIG. 5). Thus, when the core body main body portion 41 of the core body 4 is press-fitted, the holding portion 91 is displaced so as to open outward, and the core body main body portion 41 of the core body 4 is press-fitted as shown in FIG. 5C. Then, in the state in which the core body 4 is fitted to the core body holder 6 via the conductive elastic member 9A, the core body main body portion 41 of the core body 4 is retained more securely due to the narrowing of the holding portion 91, as shown in FIG. 5C. In addition, the core body 4 can be extracted from the conductive elastic member 9A by pulling the core body 4 against the fitting of the core body 4 to the core body holder 6.

While the outside diameter of the cylindrically shaped portion from the position of the locking projecting portions 94 and 95 of the conductive elastic member 9A to the holding portion 91 is gradually increased toward the holding portion 91 in the example of FIG. 5, the outside diameter of the cylindrically shaped portion of the conductive elastic member 9A over the whole of the cylindrically shaped portion may be gradually increased toward the holding portion 91.

In addition, in the conductive elastic member 9A in the example of FIG. 5, the hole portion may be formed by the through hole 9a as in the conductive elastic member 9 in the foregoing example, rather than the recessed hole 9Aa. Also in that case, the core body main body portion 41 of the core body 4 is retained more securely due to the narrowing of the holding portion 91.

<Second Modification>

In the position indicator 1 according to the foregoing embodiment, the conductive elastic member 9 as a member separate from the core body holder 6 is fitted into the core body holder 6. However, in another embodiment, the conductive elastic member may be formed in advance by deposition within the recessed hole of the core body holder.

FIG. 6 is a diagram showing a core body holder 6B and a core body 4B used in a position indicator in a thus formed example. As shown in FIG. 6, in the present example, a conductive elastic member 9B formed of a conductive rubber, for example, is formed by deposition in advance on a wall surface of a recessed hole 61Ba of a housing fitting portion 61B of the core body holder 6B.

While a core body main body portion 41 and a tip end portion 42 of the core body 4B in the present example are formed in a similar manner to those of the core body 4 in the foregoing embodiment, the core body 4B in the present example is different from the core body 4 in the foregoing embodiment in that a conductive fitting portion 43 formed of a conductive material, such as a conductive resin (conductive rubber), is formed at an end portion of the core body main body portion 41.

In the present example, the conductive fitting portion 43 at the end portion of the core body main body portion 41 of the core body 4B is inserted into the recessed hole 61Ba of the housing fitting portion 61B of the core body holder 6B, and the core body 4B is fitted into and retained by the core body holder 6B.

FIGS. 7A and 7B are diagrams of a method of manufacturing the core body 4B in the present example. As shown in FIG. 7A, a liquid 43Lq of a melted conductive rubber is prepared in a predetermined container 44. The liquid 43Lq of the conductive rubber is made to adhere to the end portion of the core body main body portion 41 of the core body 4B in the present example by dipping the end portion of the core body main body portion 41 into the liquid 43Lq of the conductive rubber within the container 44. The core body 4B is thereafter pulled up. The adhering liquid 43Lq of the conductive rubber is dried to adhere to the core body main body portion 41 securely. The conductive fitting portion 43 having an appropriate size and shape is formed at the end portion of the core body main body portion 41 by repeating the dipping of the end portion of the core body main body portion 41 into the liquid 43Lq of the conductive rubber within the container 44, where the pulling up and the drying is performed as described above (see FIG. 7B).

In another embodiment, the conductive fitting portion 43 is formed in advance, fitted to the core body main body portion 41 of the core body 4, and fixed to the core body main body portion 41 by an adhesive.

<Third Modification>

A third modification is a further modification of the second modification. The core body holder 6B in the second modification is used as it is. However, the constitution of a core body in the third modification is different from that of the second modification.

FIG. 8 is a diagram showing the core body holder 6B and a core body 4C used in a position indicator according to the third modification. As shown in FIG. 8, as with the core body 4, the core body 4C in the present example includes a core body main body portion 41 and a tip end portion 42 made of a conductive material and formed integrally with each other, and has a threaded portion 41a formed at an end portion of the core body main body portion 41. The part of the core body main body portion 41 on which part the threaded portion 41a is formed is press-fitted into the recessed hole 61Ba of the housing fitting portion 61B of the core body holder 6B. When the part of the core body main body portion 41 on which part the threaded portion 41a is formed is press-fitted into the recessed hole 61Ba, the threaded portion 41a of the core body main body portion 41 is engaged with the conductive elastic member 9B formed by deposition on the wall surface of the recessed hole 61Ba of the housing fitting portion 61B of the core body holder 6B. The core body 4C is securely retained by the core body holder 6B due to a frictional force between the threaded portion 41a of the core body main body portion 41 and the conductive elastic member 9B.

Without being limited to the case where the threaded portion 41a is formed by threading the core body main body portion 41 itself, the threaded portion 41a may be formed by fastening a threaded member to the end portion of the core body main body portion 41.

<Fourth Modification>

Figure 9:
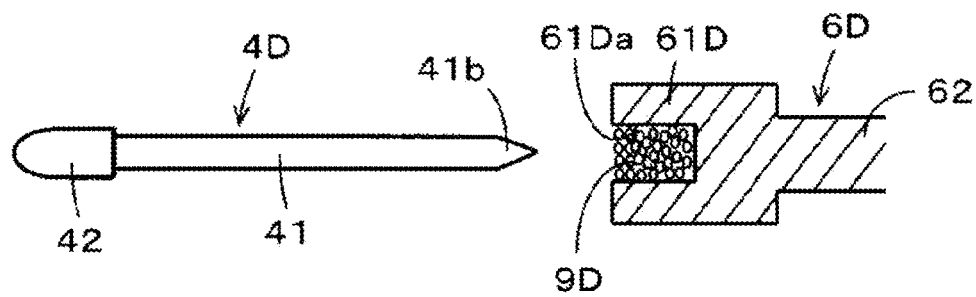
FIG. 9 is a diagram of another example of constitution of parts of the embodiment of the position indicator according to the present invention.

FIG. 9 is a diagram showing a core body holder 6D and a core body 4D used in a position indicator according to a fourth modification. As shown in FIG. 9, the core body holder 6D in the present example has a foam member of a conductive material housed and fixed as a conductive elastic member 9D in advance within a housing recessed portion 61Da of a housing fitting portion 61D.

As with the core body 4, the core body 4D in the present example includes a core body main body portion 41 and a tip end portion 42 formed of a conductive material and formed integrally with each other, and has a sharp portion 41b formed by sharpening an end portion of the core body main body portion 41. The core body 4D is fitted so as to pierce the foam member of the conductive elastic member 9D with the sharp portion 41b of the core body main body portion 41.

In the fourth modification, the sharp portion 41b is formed by sharpening the end portion of the core body main body portion 41 itself. In another embodiment, the sharp portion 41b is formed by fastening a threaded member having a sharp end and capable of being screwed to the end portion of the core body main body portion 41.

While the foam member of a conductive material is housed in the housing recessed portion 61Da of the core body holder 6D in the fourth modification, any material other than the foam member may be used as long as the material is a conductive material, the material can be pierced by the sharp portion 41b of the end portion of the core body main body portion 41 so that the core body 4 can be retained by the core body holder 6, and the core body 4 can be inserted and extracted into and from the material.

<Fifth Modification>

In the foregoing embodiment, the core body main body portion 41 and the tip end portion 42 formed of a conductive resin and formed integrally with each other are used as the core body 4. However, the core body can be formed of various conductive materials, and the core body main body portion and the tip end portion of the core body may be formed by separate bodies (i.e., separate materials).

Figure 10A:
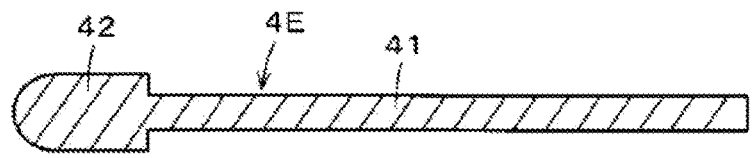
FIGS. 10A to 10D are diagrams of other examples of a core body of the embodiment of the position indicator according to the present invention.

FIGS. 10A to 10D shows some of modifications of the core body. FIG. 10A shows a core body 4E that includes a core body main body portion 41 and a tip end portion 42 formed integrally with each other as in the foregoing example, but which is formed by using a conductive metal as a conductive material. The conductive material in this example is not limited to a conductive resin or metal. For example, a conductive felt or the like can also be used.

Figure 10B:
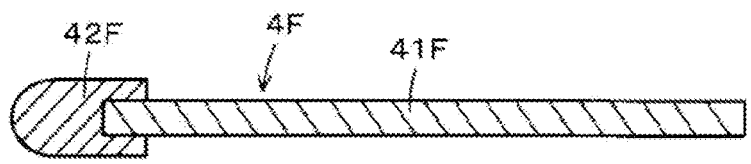

A core body 4F in the example shown in FIG. 10B is formed by coupling a core body main body portion 41F to a tip end portion 42F. The core body main body portion 41F and the tip end portion 42F are members that are separate from each other. A method such as bonding, coupling by screwing, or the like can be adopted as a method of coupling the core body main body portion 41F and the tip end portion 42F to each other.

The core body main body portion 41F in the present example is formed of a conductive material having high hardness with the strength of the core body taken into consideration. The conductive material, for example, may be made of a metal, a hard conductive resin, or the like. In addition, the tip end portion 42F is formed of a conductive material intended to be a material that provides a good slipping feeling as a feeling of contact between the core body 4F and the input surface of the position detecting device, a material that provides a feeling of slightly scratching, or a material that provides a relatively soft contact feeling. For example, the tip end portion 42F is may be made of a conductive resin.

When the core body main body portion and the tip end portion are formed of separate members as in the present example, many kinds of core bodies producing various writing feelings can be formed. A user can select and use a core body providing a desired writing feeling from among the many kinds of core bodies.

Figure 10C:
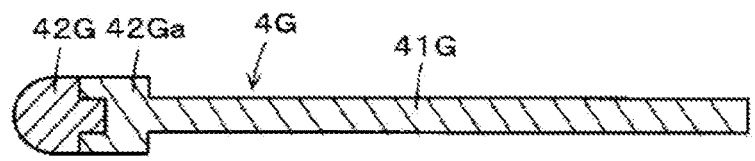

A core body 4G in the example shown in FIG. 10C includes a core body main body portion 41G and a tip end portion 42G as separate members as in the example of FIG. 10B. However, the core body main body portion 41G has a coupling portion 41Ga for coupling to the tip end portion 42G. An area of coupling to the tip end portion 42G is thus made larger than in the example of FIG. 10B so that the core body main body portion 41G and the tip end portion 42G can be coupled to each other more securely.

In the example of FIG. 10C, the core body main body portion 41G and the tip end portion 42G are both formed of a conductive resin, but are made of materials different from each other. The core body main body portion 41G and the tip end portion 42G are formed in such a manner as to be coupled to each other by two-color molding as an example of welding, or particularly thermal welding. The tip end portion 42G is formed of, for example, an elastomer or the like, and the core body main body portion 41G is formed of, for example, a polycarbonate or the like. It is needless to say that these resins have conductivity. In the example of FIG. 10C, core bodies 4 that can realize a wide variety of writing feelings can be formed by employing elastomers exhibiting various degrees of hardness and various material textures as the elastomer constituting the tip end portion 42G.

Figure 10D:
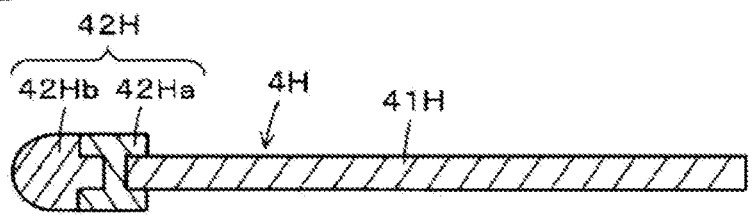

A core body 4H in the example shown in FIG. 10D has a tip end portion 42H divided into a base portion 42Ha and a projecting portion 42Hb. The base portion 42Ha and the projecting portion 42Hb are formed in such a manner as to be coupled to each other by two-color molding. A core body main body portion 41H is fitted into a recessed portion formed in the base portion 42Ha of the tip end portion 42H, and is coupled to the recessed portion by, for example, an adhesive.

The projecting portion 42Hb is made of an elastomer or a thermoplastic elastomer. The base portion 42Ha is made of a conductive resin harder than the projecting portion 42Hb. For example, the conductive resin may be a polycarbonate or an ABS resin having conductivity. In addition, the core body main body portion 41C is formed of, for example, a metal.

As described above, core bodies at least whose tip end portions are made of a plurality of kinds of different materials can be prepared. For example, materials can be prepared which provide a good slipping feeling as a feeling of contact between the tip end portion of a core body and the input surface of the position detecting device, provide a feeling of slightly scratching, and provide a relatively soft contact feeling.

Other Modifications

Incidentally, while the driving power supply of the position indicator is a battery in the description of the foregoing embodiment, a capacitor storing a power supply voltage may be provided in the position indicator, and the capacitor may be used as a driving power supply. In that case, a configuration for storing the power supply voltage in the capacitor may be the configuration of a charging circuit that receives power energy from the outside by electromagnetic induction or electric field coupling and performs charging, or a configuration in which the position indicator is further provided with a charging terminal so that a charging current is supplied from a dedicated charging device through the charging terminal. The power energy (e.g., electromagnetic energy or electric field energy) from the outside may be supplied from the position detecting device to the position indicator, or may be supplied from a dedicated power supply device.

In addition, while the electric connecting member is formed by the coil spring 13 and the conductor terminal member 14 in the foregoing embodiment, the electric connecting member is not limited to this configuration. The electric connecting member may be any configuration as long as the member can establish electric connection between the core body holder 6 and the signal transmitting circuit. In particular, in a case of a position indicator not including a pen pressure detecting module, the core body holder 6 does not move in the axial direction. Thus, a conductive member that is elastically displaced such as the coil spring 13 is unnecessary, and the electric connecting member can be formed as one part.

The invention claimed is:

1. A position indicator, comprising:
   a conductive core body;
   a conductive elastic member having a cylindrical shape and including a holding portion having a hole portion into which the conductive core body is fitted, the hole portion having an inside diameter that narrows along a direction of a central axis of a cylinder of the cylindrical shape toward a side where the conductive core body is fitted, the conductive core body being detachably fitted into the conductive elastic member;
   a conductive core body holder having a cylindrically shaped recessed hole into which the conductive elastic member is fitted to retain the conductive core body fitted in the conductive elastic member, the recessed hole having an inside diameter that is smaller than an outside diameter of the conductive elastic member of the cylindrical shape;
   a signal transmitter; and
   an electric connecting member that electrically couples the conductive core body holder and the signal transmitter to each other, the signal transmitter being configured to transmit a signal to the conductive core body through the electric connecting member, the conductive core body holder, and the conductive elastic member, wherein
   when the conductive elastic member is fitted into the recessed hole of the conductive core body holder, the holding portion of the conductive elastic member holds the conductive core body fitted in the hole portion, by being narrowed in a direction toward the central axis of the cylinder of the cylindrical shape.

2. The position indicator according to claim 1 wherein the holding portion of the conductive elastic member has a slit portion that extends from an end of the cylinder of the cylindrical shape along the direction of the central axis of the cylinder, is disposed on the end of the cylinder of the cylindrical shape, and holds and fixes the conductive core body fitted into the hole portion at the end.

3. The position indicator according to claim 1 wherein the holding portion has a diameter smaller than the outside diameter of the cylindrical shape.

4. The position indicator according to claim 1 wherein the hole portion of the conductive elastic member is a through hole that the conductive core body penetrates.

5. The position indicator according to claim 1 wherein an external wall of the conductive elastic member is provided with a projecting portion, the conductive core body holder is provided with an engaging portion to be engaged with the projecting portion when the conductive elastic member is fitted into the conductive core body holder, and the conductive elastic member is retained by the conductive core body holder when the projecting portion and the engaging portion are engaged with each other.

6. The position indicator according to claim 1 wherein
   an opposite side of the conductive core body holder from a side where the core body is fitted in the fitted conductive elastic member is coupled to a pen pressure detector, and
   the conductive core body holder is configured to transmit a pen pressure applied to the conductive core body retained via the conductive elastic member to the pen pressure detector.

7. The position indicator according to claim 6 wherein the pen pressure detector includes a retaining portion having a core body holder retaining portion retaining and fixing the conductive core body holder, and the retaining portion is made of a nonconductive material.

8. The position indicator according to claim 7 wherein
   the retaining portion includes a recessed hole into which the conductive core body holder is fitted in an axial direction of the position indicator, and
   the core body holder retaining portion includes a slit that extends from an end of the retaining portion along an axial direction of the retaining portion, is disposed on the end of the retaining portion, and retains and fixes the conductive core body holder inserted at the end.

9. The position indicator according to claim 1 wherein the electric connecting member includes a conductive coil spring, and a conductor terminal member formed by a conductor electrically coupled to the signal transmitter, the electric connecting member is electrically coupled to the conductive core body holder when an end of the conductive coil spring is engaged with the conductive core body holder, and the electric connecting member is electrically coupled to the signal transmitter when another end of the conductive coil spring abuts against the conductor terminal member.

10. The position indicator according to claim 9 wherein the coil spring biases the conductive core body holder to a side of the conductive core body in a direction of a central axis.

11. The position indicator according to claim 10 wherein the conductive core body holder moves in the direction of the central axis when a pen pressure is applied to the conductive core body, and the conductive core body holder is returned to an original position by a biasing force of the coil spring when application of the pen pressure ceases.

12. The position indicator according to claim 1 wherein the conductive core body includes a tip end portion at least a part of which projects to an outside environment, and a shaft portion continuous with the tip end portion.

13. The position indicator according to claim 12 wherein the shaft portion is thinner than the tip end portion of the conductive core body.

14. The position indicator according to claim 12 wherein the tip end portion and the shaft portion of the conductive core body are made of a metal.

15. The position indicator according to claim 12 wherein the tip end portion of the conductive core body is made of a conductive resin, and the shaft portion of the conductive core body is made of a metal.

16. The position indicator according to claim 12 wherein the tip end portion and the shaft portion of the conductive core body are made of a conductive resin.

17. The position indicator according to claim 12 wherein the tip end portion of the conductive core body is made of a first conductive resin, and the shaft portion of the conductive core body is made of a second conductive resin.

18. The position indicator according to claim 12 wherein the tip end portion and the shaft portion of the conductive core body are made of a conductive felt material.

19. The position indicator according to claim 12 wherein a tail end portion of the shaft portion of the conductive core body is a sharp portion, the tail end portion being on an opposite side from the tip end portion.

20. The position indicator according to claim 12 wherein a tail end portion of the shaft portion of the conductive core body is threaded, the tail end portion being on an opposite side from the tip end portion.

21. The position indicator according to claim 12 wherein a conductive resin is welded to a tail end portion of the shaft portion of the conductive core body, and a part of the conductive resin is fitted into the conductive elastic member, the tail end portion being on an opposite side from the tip end portion.

22. The position indicator according to claim 12 wherein the conductive elastic member has an air bubble structure having conductivity and is embedded in the conductive core body holder, and the retention of the conductive core body and electric conduction are enabled when a sharp portion of the conductive core body pierces the conductive elastic member.

* * * * *